United States Patent [19]

Smith

[11] 4,095,818
[45] Jun. 20, 1978

[54] TRAILER FRAME

[76] Inventor: Marjorie Ann M. Smith, 509 Juniper Dr., Pasadena, Calif. 91105

[21] Appl. No.: 725,572

[22] Filed: Sep. 22, 1976

[51] Int. Cl.² ............................................. B60G 11/04
[52] U.S. Cl. .................................................. 280/789
[58] Field of Search ........ 280/106 T, 106 R, 106.5 R, 280/423 R

[56] References Cited

U.S. PATENT DOCUMENTS

| | | | |
|---|---|---|---|
| 3,098,656 | 7/1963 | Gregory | 280/106 R |
| 3,214,047 | 8/1965 | Moye | 280/106 T X |
| 3,746,362 | 7/1973 | Schittenhelm | 280/106 T |
| 3,891,231 | 6/1975 | Snoberger | 280/106.5 R |
| 3,892,423 | 7/1975 | Smith | 280/106 T |
| 3,929,353 | 12/1975 | Burleson | 280/423 R |

*Primary Examiner*—Joseph F. Peters, Jr.
*Assistant Examiner*—R. Schrecengost

*Attorney, Agent, or Firm*—Christie, Parker & Hale

[57] ABSTRACT

A trailer frame for carrying tall, heavy loads includes a pair of parallel frame members of generally Z-shaped cross-sectional configuration joined together by cross-bracing to form a rigid structural frame in which the bottom flanges of the frame members extend inwardly to provide means for supporting a load inside the trailer frame. A pair of suspension springs and a tongue adapted for connection to a towing vehicle are secured to portions of the frame members located above the plane of the load-supporting flanges so as to lower the c.g. of the load. The front portion of the tongue has a step-neck for positioning a coupler at towing height above the plane of the load-supporting flanges. The tongue together with suspension spring brackets and fender braces are rigidly affixed to the frame members in a manner which increases the torsional resistance of the trailer frame.

12 Claims, 7 Drawing Figures

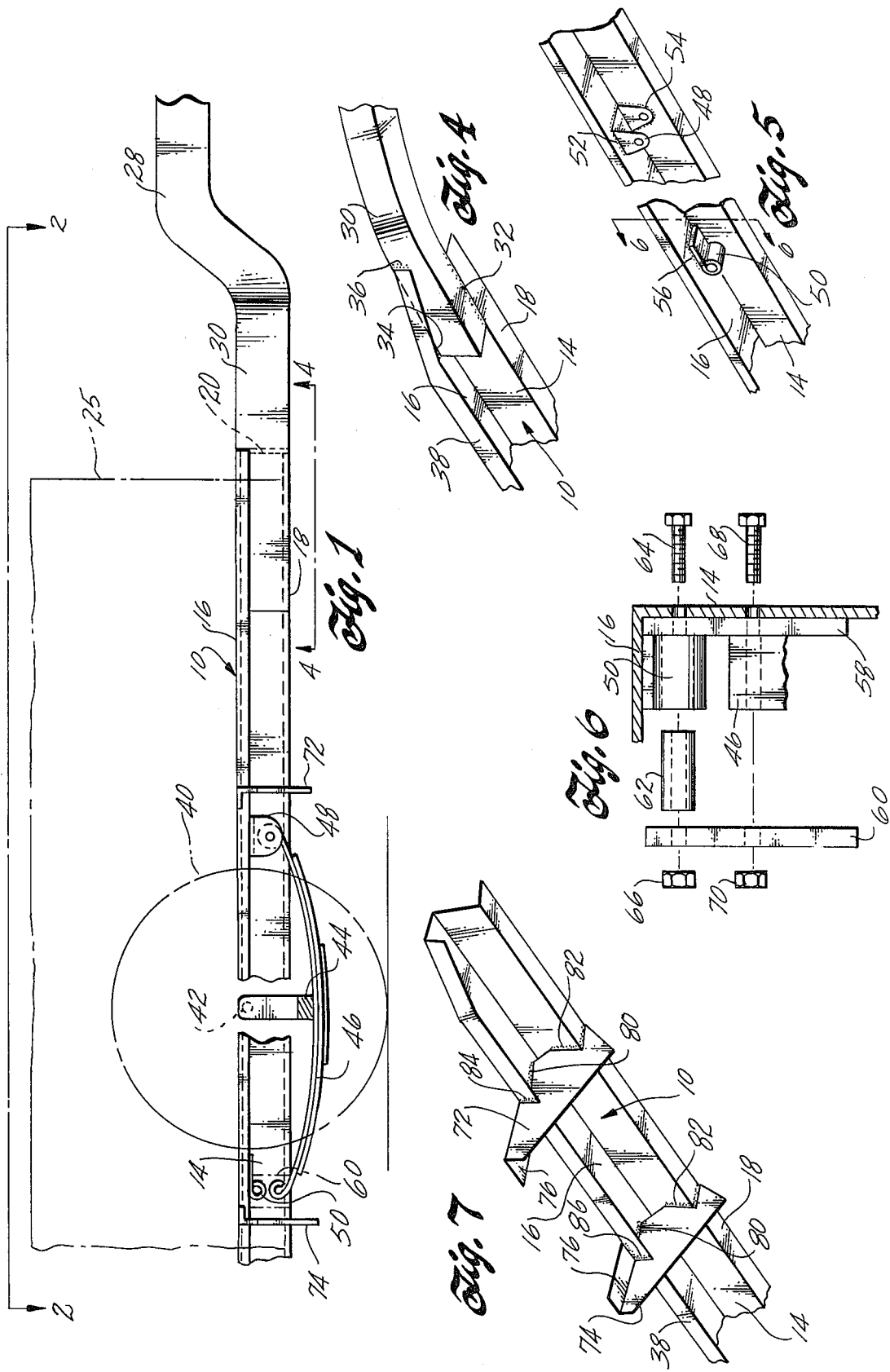

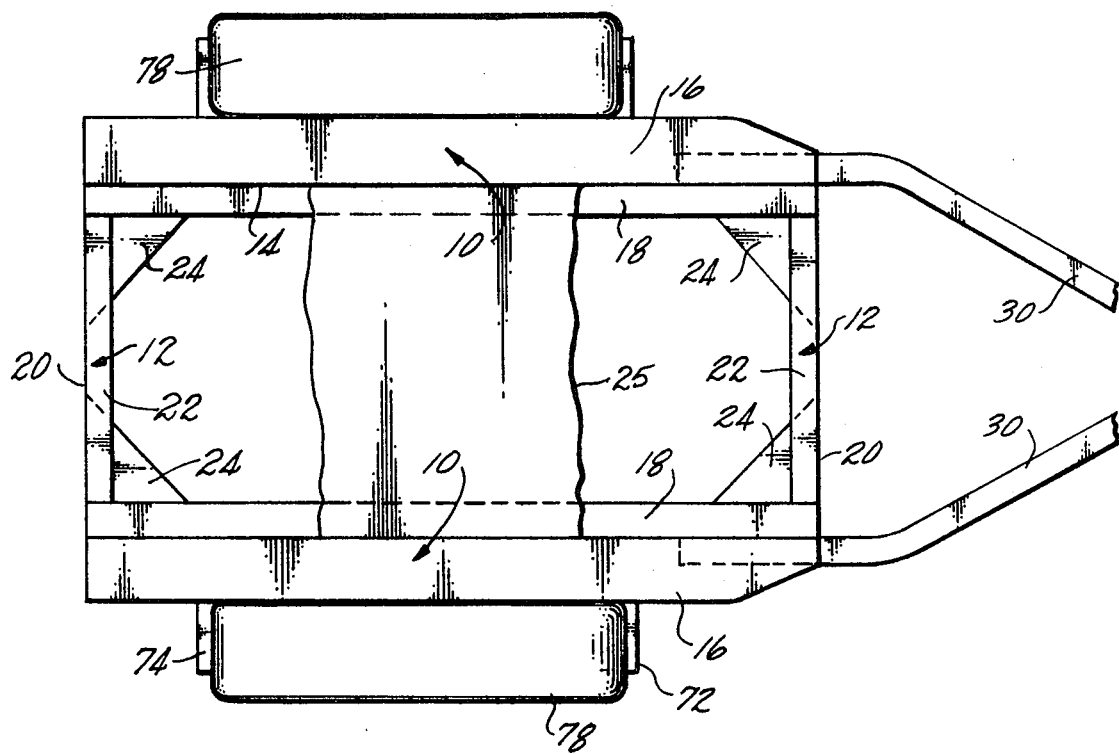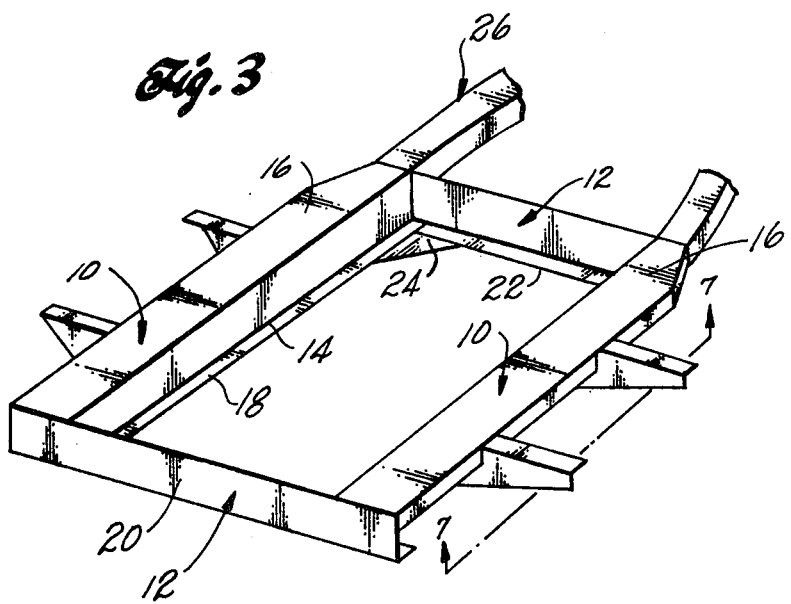

TRAILER FRAME

BACKGROUND

This invention relates generally to trailers to be towed by a towing vehicle, and more particularly to a trailer structure for lowering the c.g. of tall, heavy loads carried by the trailer.

Trailers are often designed to transport heavy equipment. Such trailers commonly include either a flatbed or spaced apart, parallel runners designed especially to carry specific types of heavy equipment. The present invention is based on the recognition that trailers designed to carry such heavy loads often are not suitable for transporting relatively tall pieces of heavy equipment. Examples of such heavy equipment are steam cleaners, compressors, etc. The flatbed or runners of prior art trailers often are incorporated into the trailer frame in such a manner that a relatively tall piece of heavy equipment is either too top-heavy to be safely towed, or extends too high to allow transporting on the highway, or both.

This invention provides a trailer frame structure which lowers the c.g. of a load carried by the trailer. This trailer structure is especially useful in carrying relatively tall pieces of heavy equipment because it produces greater stability as well as lowering the vertical height of the load. In addition, the structure for lowering the c.g. also improves the structural integrity of the trailer.

SUMMARY

Briefly, the invention includes a trailer structure having a pair of elongated frame members in the form of a channel, preferably of generally Z-shaped cross-section having an upright web with oppositely directed top and bottom flanges. The bottom flanges extend inwardly and the top flanges extend outwardly along the trailer structure. The bottom flanges form load-support means for carrying a load transported by the trailer. The trailer is adapted for towing by another vehicle by a tongue having spaced apart structural members each being secured to the bottom surface of the top flange and the outside surface of the upright web of a corresponding frame member. A pair of spaced apart brackets for mounting the suspension springs of the trailer are rigidly secured to the upright web and top flange of each frame member. A separate suspension spring is connected at its end to each corresponding pair of brackets.

The structure for securing the suspension spring brackets and the tongue to the trailer framework positions the plane of the trailer's load-carrying flanges substantially below the axis of the tongue and the transverse axes of the suspension springs. This lowers the vertical height of the load, and also lowers the c.g. of the load relative to the roll axis of the trailer, which results in better load-carrying stability during use. In addition, the means for securing the trailer tongue and suspension spring brackets to the trailer frame members improves the trailer structure's resistance to torsion when compared with prior art trailers having suspension spring fittings and a tongue, or other towing bar, secured below the load-carrying portion of the frame.

These and other aspects of the invention will be more fully understood by referring to the following detailed description and the accompanying drawings.

DRAWINGS

FIG. 1 is a fragmentary side elevation view, partly broken away and partly in cross-section, showing a presently preferred embodiment of an improved trailer frame structure according to principles of this invention;

FIG. 2 is a fragmentary top plan view, partly broken away, taken on line 2—2 of FIG. 1;

FIG. 3 is a fragmentary perspective view showing a portion of the trailer frame structure illustrated in FIGS. 1 and 2;

FIG. 4 is an enlarged fragmentary perspective view taken on line 4—4 of FIG. 1 and showing means for securing a tongue to the trailer frame;

FIG. 5 is an enlarged fragmentary perspective view showing means for securing suspension spring fittings to the trailer frame;

FIG. 6 is an enlarged fragmentary exploded elevation view, partly in cross-section, taken on line 6—6 of FIG. 5; and FIG. 7 is an enlarged fragmentary perspective view taken on line 7—7 of FIG. 3 and showing a means for securing fender braces to the trailer frame members.

DETAILED DESCRIPTION

FIGS. 1 through 3 illustrate a trailer frame having parallel, longitudinal frame members 10 joined at their ends by transverse cross-members 12. The longitudinal frame members 10 comprise channel members of generally Z-shaped cross-sectional configuration. Each frame member has a central upright web 14 and oppositely directed top and bottom flanges 16, 18 extending along the top and bottom edges, respectively, of the web 14. The longitudinal frame members 10 are arranged so that the bottom flanges 18 extend inwardly and the top flanges 16 extend outwardly along the length of the trailer frame.

The frame cross-members 12 comprise channel members of L-shaped cross-sectional configuration having an upright web 20 and a bottom flange 22. The ends of the cross-members 12 are welded to corresponding ends of the longitudinal frame members 10 to form a rigid rectangular structural frame. Diagonal gusset plates 24 are welded in the corners of the rectangular frame.

The bottom flanges 18, 22 of the longitudinal frame members 10 and the cross-members 12, respectively, provide a continuous, horizontal, planar lip extending around the inside perimeter of the trailer frame at its base. The bottom lip of the frame provides a load-support means for carrying a load (shown at 25 in FIGS. 1 and 2) transported by the trailer.

The trailer frame structure is secured to a step-neck tongue 26 having an elevated front end 28. A coupler (not shown) carried on the elevated front end 28 is adapted for connection to a towing vehicle (not shown). The front end 28 of the tongue 26 is elevated to extend at an elevation for attachment to trailer hitches of conventional height. The tongue 26 includes a pair of spaced apart longitudinal frame members 30 which taper closer toward the front end of the tongue. The rear portions of the frame members 30 are parallel to one another and are secured to corresponding trailer frame members 10. The tongue structural members 30 preferably comprise channel members of square or rectangular tubular cross-sectional configuration, although Z-shaped cross-sectional channel members also can be used.

According to principles of this invention, the rear portions of the tongue structural members 30 are secured to the front side portions of the trailer frame members 10 so that the end portions of the tongue are substantially in the same general plane as the trailer frame members. Preferably, the tongue 26 is secured to the frame members 10 so that the load-carrying flanges 18 of the trailer frame are located at an elevation below the longitudinal axes of the tongue structural members 30. As shown best in FIG. 6, the tongue structural members 30 are secured to the outside surface of the upright web 14 and the undersurface of the top flange 16 of each frame member 10. Preferably, the ends of the tongue are rigidly secured by welding them to the frame members 10. Referring to FIG. 6, each tongue structural member 30 is secured by (1) a longitudinal weld 32 at the junction between the bottom of the structural member 30 and the bottom flange 18, (2) a longitudinal weld 34 at the junction between the outside edge of the structural member 30 and the undersurface of the top flange 16, and (3) a vertical weld 36 at the junction between an outside lip 38 of the top flange 16 and the outside surface of the structural member 30. Not shown in FIG. 6 are additional L-shaped welds between the rear ends of the tongue structural members 30 and the outside surface of each web 14 and the undersurface of each top flange 16.

The trailer frame structure is supported above the ground by wheels (only one is shown in phantom line at 40 in FIG. 1) secured to elevated end portions 42 of a drop axle 44. The low portion of the drop axle is attached to central portions of a pair of trailer suspension springs 46. The ends of each suspension spring 46 are attached to corresponding front and rear fittings 48 and 50, respectively, which, in turn, are secured to the trailer frame 10 according to principles of this invention.

Referring to FIG. 5, each front suspension spring fitting 48 comprises a generally inverted U-shaped bracket having a top section secured to the underside of the top flange 16 by a U-shaped weld 52 extending around the outside edge of the fitting 48. A U-shaped weld 54 rigidly secures the downwardly extending inside ear of the fitting 48 to the outside surface of the web 14.

Each rear suspension spring fitting 50 is an eye-plate having a flat section secured to the underside of the top flange 16 and a rounded sleeve section, or eye, extending below the top flange 16. A weld 56 extends around the outside edge of the flat section of each eye-plate 50 to rigidly secure the eye-plate to the underside of the top flange 16. As shown best in FIG. 6, the rear end of each suspension spring 46 is secured to a corresponding eye-plate 50 by a flat inside link plate 58 located in a narrow space between the eye-plate 50 and the web 14 and an identical flat outside link plate 60 located outside the sleeve portion of the eye-plate 50. A tubular bushing 62 is carried in the eye of the eye-plate 50. A first bolt 64 extends through the bushing 62 and is tigthened by a nut 66 to rigidly secure the upper portions of the link plates 58, 60 to opposite sides of the eye-plate 50. A second bolt 68 extends through an opening in the rear end of the suspension spring 46 and is tigthened by a corresponding nut 70 to rigidly secure the suspension spring between the lower portions of the link plates 58, 60.

Thus, the ends of the suspension springs 46 are attached to fittings which are rigidly secured to the underside of the top flange 16 and the outside edge of the vertical web 14. This structure provides a means for lowering the load-carrying flanges 18 of the trailer frame structure relative to the points of attachment of the suspension springs to the trailer frame. Preferably, the suspension springs are located so that their transverse axes are above the lower load-supporting flanges 18. As shown in FIG. 1, the end portions 42 of the drop axle 44 position the transverse axis of rotation of the wheels 40 above the lower load-supporting flanges 18.

FIG. 7 shows a pair of fender braces 72, 74 secured to the outside edges of the longitudinal frame members 10. Each fender brace is slotted to fit around the downwardly extending lip 38 along the outside edge of each frame member 10. Each fender brace also is configured so as to provide an elongated first portion which abuts against the vertical web 14, and elongated second and third portions which abut against the top and bottom flanges 16, 18, respectively, as well as the body of the fender brace abutting against the lip 38 of the frame member 10. The fender braces include top flanges 76 which extend toward each other in a horizontal plane to provide a means of support for fenders 78 extending over the wheels of the trailer. Both opposite sides of each fender brace 72, 74 are rigidly secured to the frame member 10 by welding. Transverse welds 80 secure the brackets at their junction to the undersurface of the top flange 16. L-shaped welds 82 secure the brackets at their junction between the vertical flange 14 and the bottom flange 18. An upright weld 84 secures the outside portions of each bracket to the lip 38, and an L-shaped weld 86 secures the inside portions of the brackets to the lip 38.

The trailer structure of this invention thus provides a load-carrying means positioned lower with respect to the trailer tongue and suspension spring fittings than conventional known trailer frame structures. Thus, the trailer frame of this invention is especially suitable for carrying relatively tall, heavy loads, especially heavy equipement, in that the trailer structure lowers the c.g. of the supported load and reduces its vertical height when compared with conventional trailer frames. This increases the stability of the load during use, and also reduces limitations which otherwise prevent tall loads from being transported on the highway.

In addition, the means for rigidly affixing the tongue structural members 30 and suspension spring fittings 48, 50 to the trailer frame members 10 improves the structural integrity of the frame by increasing its resistance to torsion during use. The means for rigidly affixing the fender brackets 72, 74 to the frame members 10 also increases the torsional resistance of the trailer frame.

I claim:

1. A trailer frame structure comprising:
   a pair of substantially parallel, elongated frame members, each frame member being of generally Z-shaped cross-sectional configuration and having an upright web and top and bottom flanges extending along opposite edges of the upright web, the upright webs having outside surfaces facing outwardly along the length of the trailer structure;
   brace means holding the frame members in spaced apart relationship with said top flanges extending outwardly and having bottom surfaces thereof facing downwardly along outside portions of the frame members, said bottom flanges extending inwardly and having upper surfaces thereof facing upwardly to provide means for supporting a load carried by said bottom flanges and positioned inboard the upright webs and below the top flanges of the frame members;

tongue means having spaced apart elongated structural members adapted for connection to a towing vehicle;

means securing the tongue structural members to corresponding frame members;

a pair of longitudinally spaced apart spring mounting brackets and means rigidly securing each bracket to a corresponding frame member below the bottom surface of the top flange, above the load-carrying bottom flange, and adjacent the outside surface of the upright web of the frame member;

a pair of suspension springs extending alongside each frame member, each suspension spring extending between the brackets on a corresponding frame member;

means securing the ends of each suspension spring to the spring's corresponding brackets;

axle means extending transversely below the frame members and adapted for connection to a pair of wheels for supporting the trailer frame above the ground, the axle means being secured to the suspension springs, the opposite ends of the axle means extending upwardly adjacent to and outboard of the frame members and having means for securing the wheels to the ends of the axle means to rotate the wheels about a transverse axis elevated above the plane of the bottom load-supporting flanges of the frame members.

2. Apparatus according to claim 1 including means rigidly securing each tongue structural member to the outside surface of the upright web and the bottom surface of the top flange of a corresponding frame member.

3. Apparatus according to claim 1 in which each suspension spring has opposite ends which pivot about transverse axes located above the plane of the load-supporting bottom flanges of the frame members.

4. Apparatus according to claim 3 in which each tongue structural member has a longitudinal axis extending above the plane of said load-supporting bottom flanges.

5. Apparatus according to claim 1 in which a separate pair of longitudinally spaced apart fender braces extend transversely away from outside portions of each frame member; and including means rigidly securing an elongated first portion of each fender brace to the upright web of a corresponding frame member, and means rigidly securing an elongated second portion of each fender brace to the top flange of a corresponding frame member.

6. Apparatus according to claim 5 including means rigidly securing an elongated third portion of each fender brace to the bottom surface of the bottom flange of a corresponding frame member.

7. Apparatus according to claim 5 including a stepneck tongue means having a front portion extending above the plane of the frame members; and in which the front portion of the tongue means is adapted for connection to a towing vehicle.

8. Apparatus according to claim 1 including a stepneck tongue means having a front portion extending above the plane of the frame members; and in which the front portion of the tongue means is adapted for connection to a towing vehicle.

9. Apparatus according to claim 8 including means rigidly securing each tongue structural member to the outside surface of the upright web and the bottom surface of the top flange of a corresponding frame member.

10. Apparatus according to claim 9 in which each suspension spring has opposite ends which pivot about transverse axes located above the plane of said load-supporting bottom flanges.

11. Apparatus according to claim 10 in which the tongue structural member has a longitudinal axis extending above the plane of said load-supporting bottom flanges.

12. Apparatus according to claim 11 in which a separate pair of longitudinally spaced apart fender braces extend transversely away from outside portions of each frame member; and including means rigidly securing an elongated first portion of each fender brace to the upright web of a corresponding frame member, and means rigidly securing an elongated second portion of each fender brace to the top flange of a corresponding frame member.

* * * * *